United States Patent
Miyano

(10) Patent No.: US 9,252,621 B2
(45) Date of Patent: Feb. 2, 2016

(54) BATTERY TEMPERATURE ADJUSTING SYSTEM AND BATTERY CHARGING SYSTEM

(75) Inventor: Ryuichi Miyano, Shizuoka (JP)

(73) Assignee: SUZUKI MOTOR CORPORATION, Shizuoka (JP)

(*) Notice: Subject to any disclaimer, the term of this patent is extended or adjusted under 35 U.S.C. 154(b) by 540 days.

(21) Appl. No.: 13/469,250

(22) Filed: May 11, 2012

(65) Prior Publication Data

US 2012/0305662 A1 Dec. 6, 2012

(30) Foreign Application Priority Data

May 30, 2011 (JP) .................................. 2011-120138

(51) Int. Cl.
*G05D 22/02* (2006.01)
*H02J 7/00* (2006.01)
(Continued)

(52) U.S. Cl.
CPC ............. *H02J 7/007* (2013.01); *H01M 10/615* (2015.04); *H01M 10/625* (2015.04); *H01M 10/63* (2015.04); *H01M 10/6563* (2015.04); *H02J 7/00* (2013.01); *B60H 1/00278* (2013.01)

(58) Field of Classification Search
CPC ....... F25D 17/06; F25D 21/00; F25D 17/045; F25D 21/04; F25B 2700/02; F25B 47/003; F25B 2600/11; F25B 2600/112; F24F 3/14; F24F 2013/22; F24F 3/153; F24F 13/08; B60H 1/32; B60H 1/00278; B60H 2001/003; H01M 10/63; H01M 10/615; H01M 10/625; H01M 10/6563
USPC ................ 62/89, 90, 93, 98, 150, 173, 176.1, 62/176.6, 178, 180, 186, 239, 244, 272; 236/44 C
See application file for complete search history.

(56) References Cited

U.S. PATENT DOCUMENTS 5,490,572 A 2/1996 Tajiri et al.
2011/0016899 A1* 1/2011 Ogura ............................ 62/239
2011/0256432 A1* 10/2011 TenHouten ......... H01M 2/1072
429/50

FOREIGN PATENT DOCUMENTS

CN 101522459 A 9/2009
DE 10 2009 035 456 A1 2/2011
(Continued)

OTHER PUBLICATIONS

Office Action issued Jan. 15, 2013, in German Patent Application No. 10 2012 208 980.2, filed May 29, 2012 (with English-language translation).
(Continued)

*Primary Examiner* — Jonathan Bradford
(74) *Attorney, Agent, or Firm* — Rothwell, Figg, Ernst & Manbeck, P.C.

(57) ABSTRACT

There is provided a battery temperature adjusting system for realizing warming of a battery without dew condensation, and for charging the battery in an efficient manner. The battery temperature adjusting system includes: a battery temperature sensor for detecting a temperature of a battery pack; a duct for blowing warm wind toward the battery pack; a controller for warming the battery pack by causing the warm wind to be flown into around the battery in accordance with the temperature detected by the battery temperature sensor; a dew condensation determining unit for determining whether or not dew condensation occurs on the battery pack; and an evaporator for dehumidifying the warm wind. The controller causes the dehumidified warm wind to be flown into around the battery pack, when determining that the dew condensation will occur on the battery pack.

14 Claims, 13 Drawing Sheets

(51) Int. Cl.
  *H01M 10/625*   (2014.01)
  *H01M 10/63*    (2014.01)
  *H01M 10/615*   (2014.01)
  *H01M 10/6563*  (2014.01)
  *B60H 1/00*     (2006.01)

(56) References Cited

FOREIGN PATENT DOCUMENTS

| JP | 5-262144 A      |   | 10/1993 |
| JP | 8-40088 A       |   | 2/1996  |
| JP | 2006-172931 A   |   | 6/2006  |
| JP | 2006172931 A    | * | 6/2006  |
| JP | 2007-40583 A    |   | 2/2007  |
| JP | 2008098060 A    | * | 4/2008  |
| JP | 2009-110829 A   |   | 5/2009  |
| JP | 2009-154697 A   |   | 7/2009  |

OTHER PUBLICATIONS

Notification of Second Office Action mailed Feb. 16, 2015 in corresponding Chinese Patent Application No. 201210171831.6 (with an English translation) (13 pages).
Office Action mailed Jul. 30, 2014 in corresponding Chinese Patent Application No. 201210171831.6 (with an English translation) (15 pages).
Notice of Allowance mailed Oct. 21, 2014 in corresponding Japanese Patent Application No. 2011-120138 (1 page).
Notice of Allowance mailed in corresponding German Patent Application No. 10 2012 208 980.2 (6 pages).

* cited by examiner

*FIG. 4*

| TEMPERATURE OF WIND $T_W$(°C) | HUMIDITY OF WIND $H_W$(%) | | | | | | | | | | | | | |
|---|---|---|---|---|---|---|---|---|---|---|---|---|---|---|
| | 30 | 35 | 40 | 45 | 50 | 55 | 60 | 65 | 70 | 75 | 80 | 85 | 90 | 95 |
| 30 | 10.5 | 12.9 | 14.9 | 16.8 | 18.4 | 20.0 | 21.4 | 22.7 | 23.9 | 25.1 | 26.2 | 27.2 | 28.2 | 29.1 |
| 29 | 9.7 | 12.0 | 14.0 | 15.9 | 17.5 | 19.0 | 20.4 | 21.7 | 23.0 | 24.1 | 25.2 | 26.2 | 27.2 | 28.1 |
| 28 | 8.8 | 11.1 | 13.1 | 15.0 | 16.6 | 18.1 | 19.5 | 20.8 | 22.0 | 23.2 | 24.2 | 25.2 | 26.2 | 27.1 |
| 27 | 8.0 | 10.2 | 12.2 | 14.1 | 15.7 | 17.2 | 18.6 | 19.9 | 21.1 | 22.2 | 23.3 | 24.3 | 25.2 | 26.1 |
| 26 | 7.1 | 9.4 | 11.4 | 13.2 | 14.8 | 16.3 | 17.6 | 18.9 | 20.1 | 21.2 | 22.3 | 23.3 | 24.2 | 25.1 |
| 25 | 6.2 | 8.5 | 10.5 | 12.2 | 13.9 | 15.3 | 16.7 | 18.0 | 19.1 | 20.3 | 21.3 | 22.3 | 23.2 | 24.1 |
| 24 | 5.4 | 7.6 | 9.6 | 11.3 | 12.9 | 14.4 | 15.8 | 17.0 | 18.2 | 19.3 | 20.3 | 21.3 | 22.3 | 23.1 |
| 23 | 4.5 | 6.7 | 8.7 | 10.4 | 12.0 | 13.5 | 14.8 | 16.1 | 17.2 | 18.3 | 19.4 | 20.3 | 21.3 | 22.2 |
| 22 | 3.6 | 5.9 | 7.8 | 9.5 | 11.1 | 12.5 | 13.9 | 15.1 | 16.3 | 17.4 | 18.4 | 19.4 | 20.3 | 21.2 |
| 21 | 2.8 | 5.0 | 6.9 | 8.6 | 10.2 | 11.6 | 12.9 | 14.2 | 15.3 | 16.4 | 17.4 | 18.4 | 19.3 | 20.2 |
| 20 | 1.9 | 4.1 | 6.0 | 7.7 | 9.3 | 10.7 | 12.0 | 13.2 | 14.4 | 15.4 | 16.4 | 17.4 | 18.3 | 19.2 |
| 19 | 1.0 | 3.2 | 5.1 | 6.8 | 8.3 | 9.8 | 11.1 | 12.3 | 13.4 | 14.5 | 15.5 | 16.4 | 17.3 | 18.2 |
| 18 | 0.2 | 2.3 | 4.2 | 5.9 | 7.4 | 8.8 | 10.1 | 11.3 | 12.5 | 13.5 | 14.5 | 15.4 | 16.3 | 17.2 |
| 17 | -0.6 | 1.4 | 3.3 | 5.0 | 6.5 | 7.9 | 9.2 | 10.4 | 11.5 | 12.5 | 13.5 | 14.5 | 15.3 | 16.2 |
| 16 | -1.4 | 0.5 | 2.4 | 4.1 | 5.6 | 7.0 | 8.2 | 9.4 | 10.5 | 11.6 | 12.6 | 13.5 | 14.4 | 15.2 |
| 15 | -2.2 | -0.3 | 1.5 | 3.2 | 4.7 | 6.1 | 7.3 | 8.5 | 9.6 | 10.6 | 11.6 | 12.5 | 13.4 | 14.2 |
| 14 | -2.9 | -1.0 | 0.6 | 2.3 | 3.7 | 5.1 | 6.4 | 7.5 | 8.6 | 9.6 | 10.6 | 11.5 | 12.4 | 13.2 |
| 13 | -3.7 | -1.9 | -0.1 | 1.3 | 2.8 | 4.2 | 5.5 | 6.6 | 7.7 | 8.7 | 9.6 | 10.5 | 11.4 | 12.2 |
| 12 | -4.5 | -2.6 | -1.0 | 0.4 | 1.9 | 3.2 | 4.5 | 5.7 | 6.7 | 7.7 | 8.7 | 9.6 | 10.4 | 11.2 |
| 11 | -5.2 | -3.4 | -1.8 | -0.4 | 1.0 | 2.3 | 3.5 | 4.7 | 5.8 | 6.7 | 7.7 | 8.6 | 9.4 | 10.2 |
| 10 | -6.0 | -4.2 | -2.6 | -1.2 | 0.1 | 1.4 | 2.6 | 3.7 | 4.8 | 5.8 | 6.7 | 7.6 | 8.4 | 9.2 |

BATTERY TEMPERATURE ADJUSTING SYSTEM AND BATTERY CHARGING SYSTEM

CROSS-REFERENCE

This document claims priority to Japanese Application Number 2011-120138, filed May 30, 2011, the entire content of which is hereby incorporated by reference.

TECHNICAL FIELD

The present invention relates to a battery temperature adjusting system and a battery charging system, and in particular, to a battery temperature adjusting system and a battery charging system for realizing charging of the battery mounted in a vehicle in an efficient manner without being influenced by the external environment.

BACKGROUND ART

Generally, a vehicle is equipped with a battery for storing electric energy to be supplied to various electric parts. For instance, an electric vehicle running only by an electric motor is equipped with a large capacity of battery to repeatedly run by charging the battery with an external charger. For charging this type of a vehicle battery, not only an electric vehicle but also, for example, a hybrid vehicle running by a combination of an electric motor and an internal combustion engine, the electric energy is recovered as a regenerative energy to be stored on the battery while running. In addition to it, the battery is sometimes made chargeable from an external charger. Further, since various types of fuel are converted into the electric energy in a fuel cell powered vehicle, the battery for storing the converted electric energy can be charged from an external charger.

This type of vehicle battery is subject to the influence of external environments such as an external temperature, in some cases. An example is that when the battery has a low temperature when it is charged, the charging efficiency will degrade. Therefore, there is a proposal for using an air conditioner of the vehicle to flow hot wind to the battery side so that the battery can be warmed to fall within a temperature range in which the battery can be charged in an efficient manner (examples are Patent Documents 1 to 3).

In these years, the quick charge of the vehicle battery is enabled for widespread use. In particular, since the charging efficiency degrades under the low-temperature condition below the freezing point, the quick charge would be made impossible. Hence, it is important to warm the battery to fall within the most suitable temperature range quickly.

PRIOR ART DOCUMENTS

Patent Documents

Patent Document 1: H05-262144 A
Patent Document 2: H08-40088 A
Patent Document 3: 2006-172931 A

SUMMARY OF THE INVENTION

Problem to be Solved

However, in warming the battery in this manner, the battery is simply warmed by flowing hot wind to the battery side. Accordingly, dew condensation would occur at the battery surface depending on the relationship (condition) between the temperature and humidity, thereby leading to an insulation failure.

Therefore, the present invention has an object of providing a battery temperature adjusting system for warming the battery without dew condensation and charging the battery in an efficient manner without causing an problem.

Solution to the Problem

In order to solve the above problem, according to a first aspect of the present invention, there is provided a battery temperature adjusting system comprising: a battery temperature detector for detecting a temperature of a battery mounted in a vehicle and repeatedly chargeable; a warm wind blowing unit for blowing warm wind toward the battery; a temperature adjusting controller for warming the battery by causing the warm wind blowing unit to blow the warm wind and flow the warm wind around the battery in accordance with the temperature of the battery detected by the battery temperature detector; a dew condensation determining unit for determining whether or not dew condensation occurs on the battery with the flown warm wind; and a dehumidifying unit for dehumidifying at least around a part into which the warm wind is flown, wherein the temperature adjusting controller causes the dehumidifying unit to dehumidify around the battery, when the dew condensation determining unit determines that the dew condensation occurs on the battery.

In order to solve the above problem, according to a second aspect of the present invention, in the battery temperature adjusting system according to the first aspect, the dehumidifying unit may dehumidify the warm wind blown from the warm wind blowing unit and flows the dehumidified warm wind around the battery to dehumidify the part into which the dehumidified warm wind is flown.

In order to solve the above problem, according to a third aspect of the present invention, in the battery temperature adjusting system according to the first aspect, the warm wind blowing unit may comprise a flow passage switching unit for switching a flow passage for blowing the warm wind of the air conditioner provided in the vehicle to an interior of the vehicle to blow the worm wind toward the battery and the dehumidifying unit may be composed of a dehumidifying function included in the air conditioner.

In order to solve the above problem, according to a fourth aspect of the present invention, there is provided a battery charging system for repeatedly charging a battery mounted in a vehicle and repeatedly chargeable from an external charger, the battery charging system comprising: the battery temperature adjusting system according to the third aspect; and a power controller for controlling a driving power of an electric compressor included in the air conditioner to be supplied from the external charger, when the dehumidifying unit dehumidifies around the battery in charging the battery.

In order to solve the above problem, according to a fifth aspect of the present invention, in the battery temperature charging system according to the fourth aspect, the power controller may subtract a chargeable power of the battery and the driving power of the electric compressor from a chargeable power of the external charger to calculate a power that can be assigned to supply of the warm wind and controls to be supplied with the power.

Advantageous Effects of the Invention

According to the first aspect of the present invention as described above, when the temperature of the battery mounted in a vehicle is low and it is determined that dew condensation will occur by the inflow of the warm wind (when it is necessary to warm with the warm wind to charge the battery in an efficient manner), it is possible to dehumidify at least around the battery to avoid the dew condensation. Accordingly, it is possible to warm the battery without dew condensation even at a low temperature of the external environment that is not suitable for charging the battery, and also possible to charge the battery quickly.

In addition, according to the second aspect of the present invention as described above, it is possible to flow the dehumidified warm wind to the battery side and warm around the battery. It is also possible to dehumidify the wind to avoid the dew condensation without the need of a special mechanism for dehumidifying around the battery, and quickly charge the battery easily and simply without dew condensation.

Furthermore, according to the third aspect of the present invention as described above, the flow passage of the warm wind blown from the air conditioner equipped in the vehicle is switched, so that the warm wind dehumidified by the dehumidifying function of the air conditioner can be flown into around the battery. It is therefore possible to dehumidify around the battery to avoid the dew condensation simply and easily and quickly charge the battery.

Moreover, according to the fourth aspect of the present invention as described above, the battery can be warmed with the dehumidified warm wind by use of the air conditioner equipped in the vehicle, even in a system for charging the battery mounted in the vehicle with a charger provided at the outside of the vehicle. It is therefore possible to charge the battery quickly without dew condensation simply and easily. Additionally, since the charger supplies the power necessary for driving the electric compressor, it is possible not to decrease the power charged in the battery mounted in the vehicle.

Furthermore, according to the fifth aspect of the present invention as described above, it is possible to operate the air conditioner and warm the wind with a surplus power when the charger provided at the outside of the vehicle quickly charges the battery and charge the battery quickly, while avoiding the charging period to be longer by the power consumption for warming.

BRIEF DESCRIPTION OF THE DRAWINGS

FIG. 4 is a list illustrative of dewing condition map;

DESCRIPTION OF EMBODIMENTS

Hereinafter, embodiments of the present invention will be described in detail with reference to the drawings. FIG. 1 to FIG. 13 are views illustrative of an embodiment of a battery temperature adjusting system and a battery charging system according to the present invention.

Figure 1:
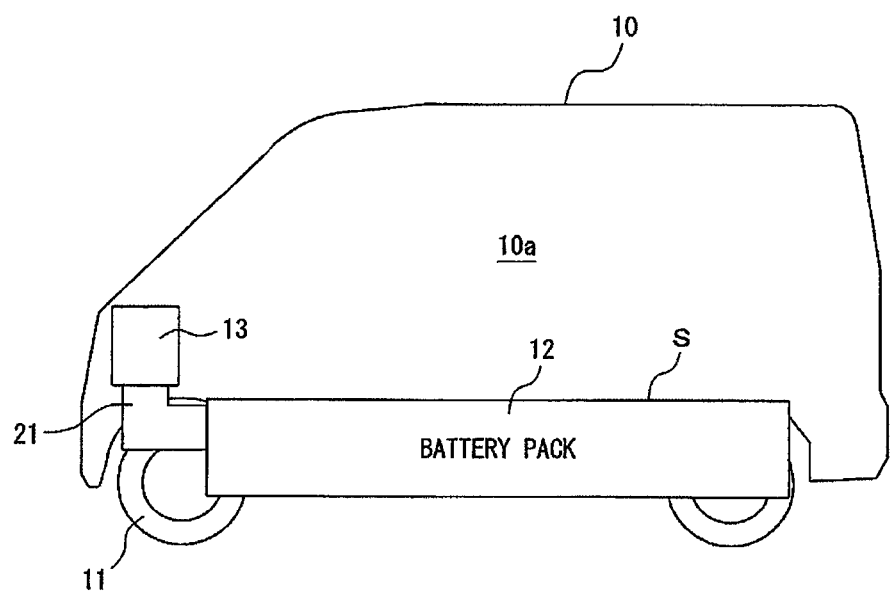
FIG. 1 is a view illustrative of an embodiment of a battery temperature adjusting system and a battery charging system according to the present invention, and is a perspective side view illustrative of an outline configuration of a vehicle in which the systems are applied.
Figure 2:
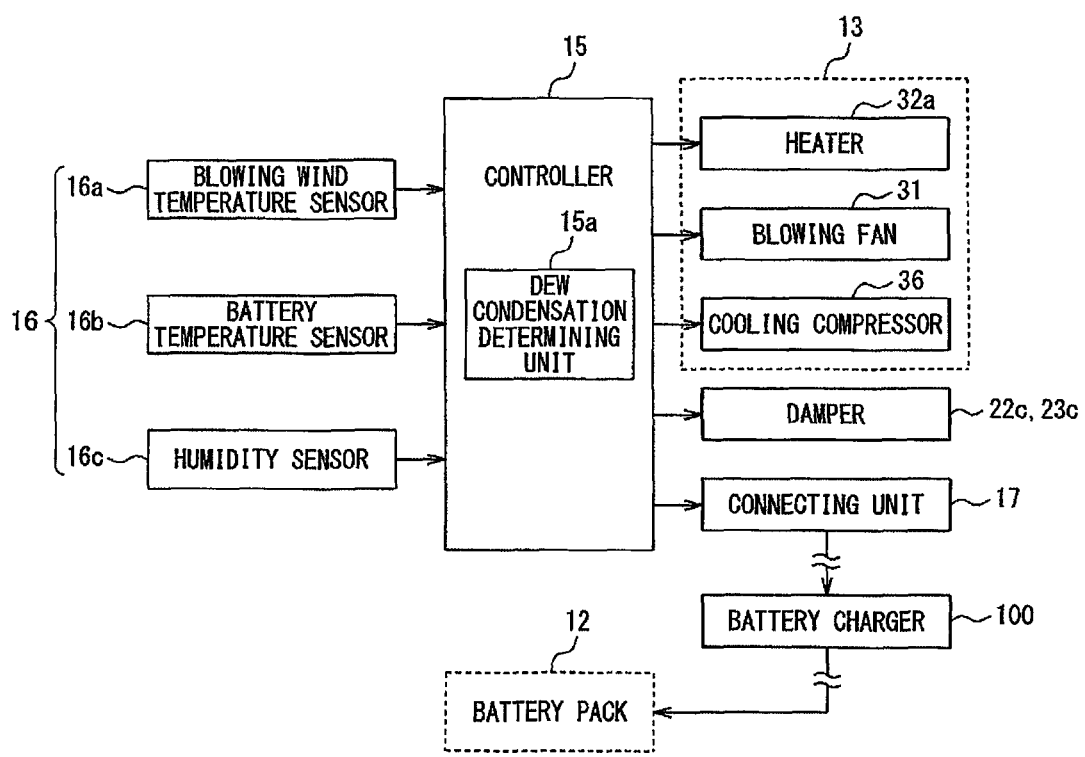
FIG. 2 is a block diagram illustrative of the overall configuration.

In FIG. 1 and FIG. 2, an electric car (vehicle) 10 is run to be provided with: an electric motor, not illustrated, that is a driving source for rolling drive wheels 11; and a battery pack 12 of a large capacity for storing electric energy to be supplied as the power to the electric motor. In the electric vehicle 10, in principle, the power is supplied from the battery pack 12 to, for example, an air-conditioning equipment (a Heating, Ventilating, and Air Conditioning (HVAC) system) 13 for heating, ventilating, and air conditioning a vehicle interior 10a, and various electric components and electric parts equipped in the vehicle such as a controller 15 and various sensors 16, as will be described later, while the vehicle is running and when the vehicle stops.

Figure 3:
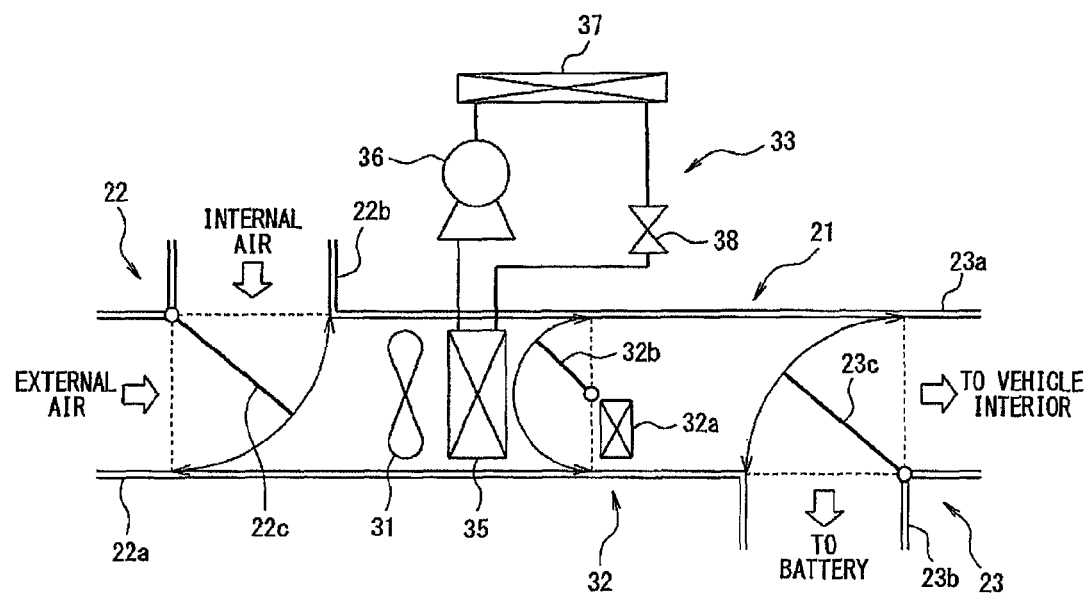
FIG. 3 is a conceptual diagram illustrative of the substantial configuration.

Herein, the air-conditioning equipment 13, as illustrated in FIG. 3, is provided with: a blowing fan 31 for forming an air flow by forcibly taking the air from the upstream side into a duct (flow passage) 21 to blow out the air to the downstream side; a heating unit 32 for heating the air passing through the duct 21; and a cooling unit 33 for cooling the air passing through the inside of the duct 21.

The heating unit 32 is composed of: a heater core 32a for heating the air passing through the inside of the duct 21; and a switching damper 32b for switching between flow passages for causing the air passing through the inside of the duct 21 to pass through and not to pass through the inside of the heater core 32a, and the heater core 32a and the switching damper 32b are disposed in the duct 21. The heater core 32a of the heating unit 32 is supplied with the power from the battery pack 12 and energized to produce heat. When the flow passage in touch with the heater core 32a is selected, the heater core 32a heats the air (temperature-adjusted wind).

The cooling unit 33 is provided with: an evaporator (cooling and dehumidifying unit) 35, installed in the duct 21, for cooling the air by use of vaporization heat produced by evaporation of a coolant; an electric cooling compressor 36 for circulating the coolant via the evaporator 35; a condenser (steam condenser) 37 for condensing the coolant pushed in by the cooling compressor 36; and an expansion valve 38 for expanding and evaporating the coolant condensed by the condenser 37 before the coolant is introduced into the evaporator 35. The cooling compressor 36 of the cooling unit 33 is supplied with the power from the battery pack 12 and energized to circulate the coolant via the condenser 37 and the expansion valve 38, so as to cool down and dehumidify the air (temperature-adjusted wind) passing through and in touch therewith by cooling down the evaporator 35 with the vaporization heat.

The duct 21 is coupled with an external-internal duct 22 on the upstream side of the main body of the air-conditioning equipment 13, and is coupled with an internal-internal duct 23 on the downstream side of the main body of the air-conditioning equipment 13. The external-internal duct 22 is provided with: an external air communicating unit 22a for communication with the exterior; an internal air communicating unit 22b for communication with the inside of the vehicle interior 10a; and an external-internal damper 22c for adjusting the communication amounts of the air communicating units 22a and 22b. The external-internal damper 22c of the external-internal duct 22 is driven by a driving motor, not illustrated, so that the flowing source to be taken into the duct 21 can be switched between or adjusted for allocation between the external air via the external air communicating unit 22a and the internal air within the vehicle interior 10a via the internal air communicating unit 22b.

In addition, the controller 15 controls the electric car 10 in a unified manner in accordance with control programs prepared beforehand based upon various types of information to be described later. The controller 15 controls opening and closing of the external-internal damper 22c of the external-internal duct 22 based upon, for example, the driver's input operation into the operation panel, not illustrated, or the room temperature (sensor information) in the vehicle interior 10a detected by a vehicle interior temperature sensor, not illustrated, so that an air inlet of the duct 21 is switched to either one of the external air communicating unit 22a or the internal air communicating unit 22b, and in addition, the controller 15 controls driving of the air-conditioning equipment 13. In this situation, the controller (temperature adjusting controller and power controller) 15 performs various control operations with the CPU and memory to send control signals to the respective parts of the devices, such as the air-conditioning equipment 13, for driving them to function as a heater controller, a blowing fan controller, a cooling compressor controller, a damper controller, and the like. However, the controller 15 may be configured to control not only the driving of the whole units in a unified manner but also the driving of the respective units in a distributed manner.

Accordingly, the air-conditioning equipment 13 drives the blowing fan 31, with or without activating the heating unit 32 or the cooling unit 33, to flow the external air through the duct 21 into the vehicle interior 10a or circulate the internal air in the vehicle interior 10a through the duct 21. Thus, the air in the vehicle interior 10a can be cleaned, heated up by the heating unit 32, or cooled down by the cooling unit 33 to be adjusted at a pleasant temperature. Specifically, in a case where there is a heat-producing part such as in a hybrid automobile equipped with an internal combustion engine (engine), the heating unit 32 may heat the air in the duct 21 by removing the heat of cooling water for cooling down the internal combustion engine via a heat exchanger.

Then, in general, the battery pack 12 stores the regenerative electric energy by causing the electric motor to function as a power generator while the vehicle is running, and in addition, needs to store the power by connecting via a connecting unit 17 to a battery charger 100 of a charging facility provided at a house or various facilities at the outside of the vehicle.

The battery pack 12 is produced to be quickly chargeable with a lithium-ion battery and is installed in an accommodating space S. It is difficult to quickly charge this lithium-ion battery, because the charging efficiency degrades under a low-temperature condition (environment) such as below the freezing point. It is impossible to warm the lithium-ion battery sufficiently by use only of the heat produced in the flow of the charging current. For this reason, the electric car 10 is provided with the duct 21 for enabling the warm wind blown out of the air-conditioning equipment 13 to be introduced (flown) into the accommodating space S. Additionally, since the battery pack 12 is sometimes overheated by the inflow of a heavy-current while being charged in summer, the cool wind blown out of the air-conditioning equipment 13 can be introduced through the duct 21 into the accommodating space S to cool down the battery pack 12.

To be more precise, in the duct 21, referring to FIG. 3, in a similar manner to the external air communicating unit 22a, the internal air communicating unit 22b, and the external-internal damper 22c of the external-internal duct 22, the internal-internal duct 23 is provided with: a vehicle interior communicating unit 23a for communication with the inside of the vehicle interior 10a; a battery communicating unit 23b (warm wind blowing unit) for communication with the accommodating space S of the battery pack 12; and an internal-internal damper (flow passage switching unit) 23c for adjusting communication amounts of the communicating units 23a and battery communicating unit 23b. The internal-internal damper 23c of the internal-internal duct 23 is driven by a drive motor, not illustrated, so that the blowing destination of the temperature-adjusted wind by the air-conditioning equipment 13 can be adjusted by switching to one of the inside of the vehicle interior 10a via the vehicle interior communicating unit 23a and the accommodating space S of the battery pack 12 through the battery communicating unit 23b.

In addition, the controller 15 is connected with: a blowing wind temperature sensor (warm wind temperature detector) 16a for detecting the temperature of the external-internal duct 22 side (downstream side of the air-conditioning equipment 13) in the external-internal duct 21; a battery temperature sensor (battery temperature detector) 16b for detecting the surface temperature of the battery pack 12; and a humidity sensor (humidity detector) 16c for detecting the humidity of the external-internal duct 22 side in the duct 21, the blowing wind temperature sensor 16a, the battery temperature sensor 16b, and the humidity sensor 16c serving as the various sensors 16. When the controller 15 causes the battery pack 12 connected through the connecting unit 17 to the battery charger 100 to store the power and determines that the temperature adjustment of the battery pack 12 is necessary by use of the air-conditioning equipment 13 based upon sensor information detected by the various sensors 16a to 16c or charging information received from the battery charger 100 side, the controller 15 controls the opening and closing of the external-internal damper 22c and the internal-internal damper 23c of the duct 21. In addition, the controller 15 controls and adjusts driving of the air-conditioning equipment 13 so that the battery pack 12 can be charged efficiently and sufficiently with comfort.

In particular, the controller 15 according to the present embodiment distributes the power supplied via the connecting unit 17 from the battery charger 100 not only to the battery pack 12 but also to the air-conditioning equipment 13 and other load devices, and completes the charging of the battery pack 12 quickly and efficiently while effectively and sufficiently utilizing the power supplying capability of the battery charger 100.

Furthermore, by performing the control program and the like, the controller 15 also functions as a dew condensation determining unit 15a for determining whether or not the dew condensation occurs on the surface of the battery pack 12 based upon the sensor information detected by the blowing wind temperature sensor 16a, the battery temperature sensor 16b, and the humidity sensor 16c. The controller 15 (the dew condensation determining unit 15a) acquires a temperature of wind $T_W$ of the air-conditioned wind to be blown into the accommodating space S of the battery pack 12 detected by the blowing wind temperature sensor 16a, a battery temperature $T_{BAT}$ on the surface of the battery pack 12 in the accommodating space S detected by the battery temperature sensor 16b, and a humidity of wind $H_W$ of the air-conditioned wind to be blown into the accommodating space S detected by the humidity sensor 16c, and leads to (calculates) a dewing temperature $T_{DEW}$ to correspond to the temperature of wind $T_W$ and the humidity of wind $H_W$ based upon a dew condensation map illustrated in FIG. 4 stored beforehand. Then, when the battery temperature $T_{BAT}$ of the battery pack 12 is lower than the dewing temperature $T_{DEW}$ ($T_{BAT} < T_{NEW}$ ($T_W$, $B_W$)), the controller 15 determines that dew condensation will occur on the surface of the battery pack 12. The controller 15 performs either one of a heating mode or a dehumidification heating mode to be described later based upon the determination result of the dew condensation determining unit 15a, and adjusts the charging of the battery pack 12 efficiently and sufficiently in a comfortable manner. Specifically, the dew condensation map of FIG. 4 has the temperature of wind $T_W$ in column and the humidity of wind $H_W$ in row. The list shows the dewing temperature $T_{DEW}$ to correspond to the temperature of wind $T_W$ and the humidity of wind $H_W$.

Figure 5:
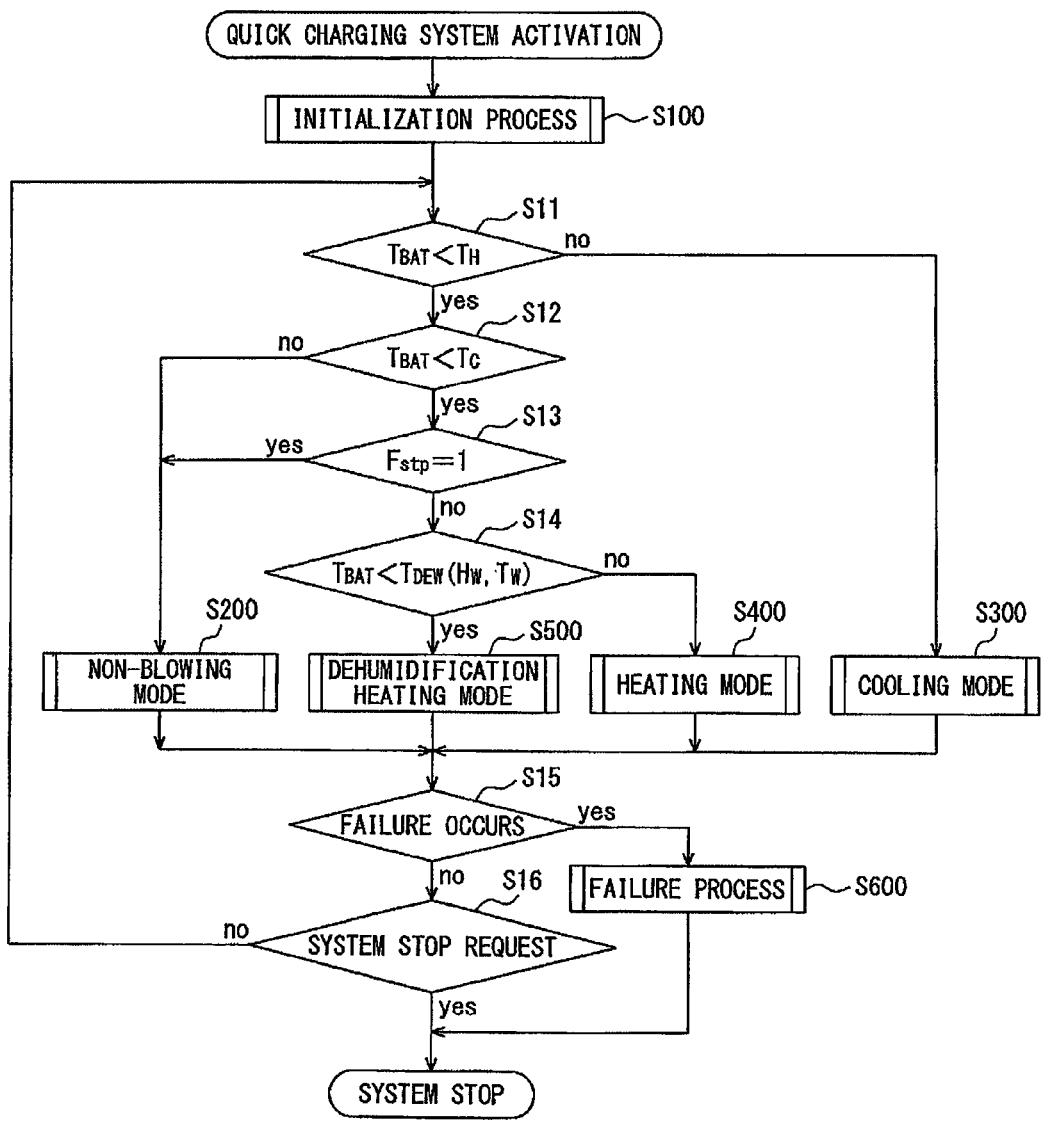
FIG. 5 is a flowchart illustrative of temperature control at the time of quick charge.

In detail, when the connecting unit 17 is connected to the battery charger 100 and the quick charging is selected and instructed, the controller 15 performs the quick charging of the battery pack 12 in a process procedure (charging procedure method) indicated by the flowchart of FIG. 5 according to a charging control program.

(Temperature Adjusting Process Procedure: Non-Blowing Mode)

Firstly, when the connection of the battery charger 100 to the connecting unit 17 is detected, an initialization process for resetting a flag ($F_{stp}$=0) to be described later, for temporary memory retention and the like (step S100). The battery temperature $T_{BAT}$ on the surface of the battery pack 12 detected by the battery temperature sensor 16b is compared with a preset cooling needed temperature threshold $T_H$ for determining that the cooling is needed (step S11). When it is determined that the battery temperature $T_{BAT}$ is lower than the cooling needed temperature threshold $T_H$ and the cooling is not needed, continuously the battery temperature $T_{BAT}$ is compared with a preset warming needed temperature threshold $T_C$ for determining that the warming is needed (step S12). When it is determined that the battery temperature $T_{BAT}$ is equal to or higher than (is not lower than) the warming needed temperature threshold $T_C$, warming is not needed, and the temperature adjustment of the battery pack 12 with the use of the air-conditioning equipment 13 is not needed, a non-blowing mode for quickly charging the battery pack 12 is performed without blowing the wind into the accommodating space S of the battery pack 12 (step S200).

While this mode is being performed, whether or not trouble (failure) occurs is confirmed (step S15). When the occurrence of a failure is confirmed, a failure process is performed in accordance with the occurred trouble (step S600) and the quick charging control is ended (interrupted).

When the occurrence of a failure is not confirmed at step S15, it is confirmed whether or not there is the stop request, when an input operation is given from an operation panel, not illustrated, to instruct to stop the quick charge of the battery pack 12, or when the quick charge is completed (step S16). When there is a stop request, this quick charging control is ended. On the other hand, where there is no request of stopping the quick charge of the battery pack 12, processing goes back to step S11 to repeat the same processing before the quick charge is completed.

Figure 6:
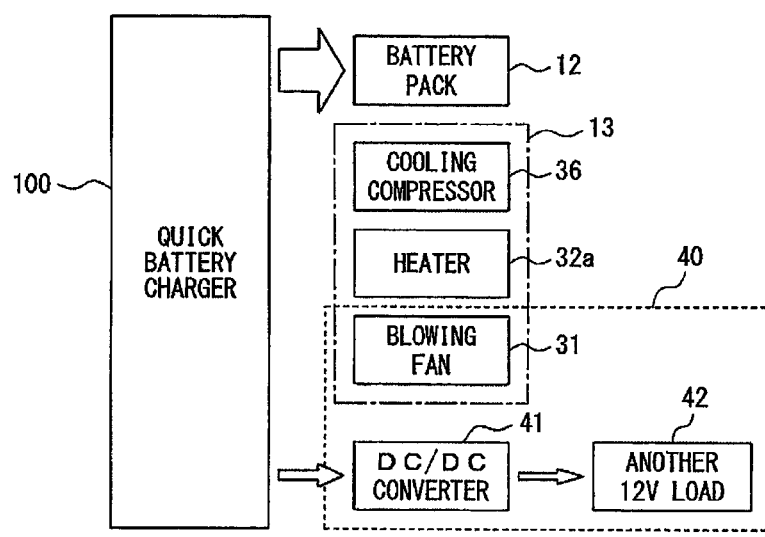
FIG. 6 is a block diagram illustrative of power supply distributions in a non-blowing mode.

Thus, when the battery pack 12 has a temperature within a quickly chargeable range ($T_C \le T_{BAT} < T_H$) to have a sufficient amount, the power is not supplied to the air-conditioning equipment 13, as illustrated in FIG. 6. In other words, the quick charging control is enabled to sufficiently utilize the supply capability of the battery charger 100 in an effective manner, while supplying a low-voltage (DC 12V) direct current converted by a DC/DC converter 41 to a minimum electric part (load) 42. It is possible to store a sufficient amount of electric energy in the battery pack 12 quickly.

(Cooling Mode)

Figure 7:
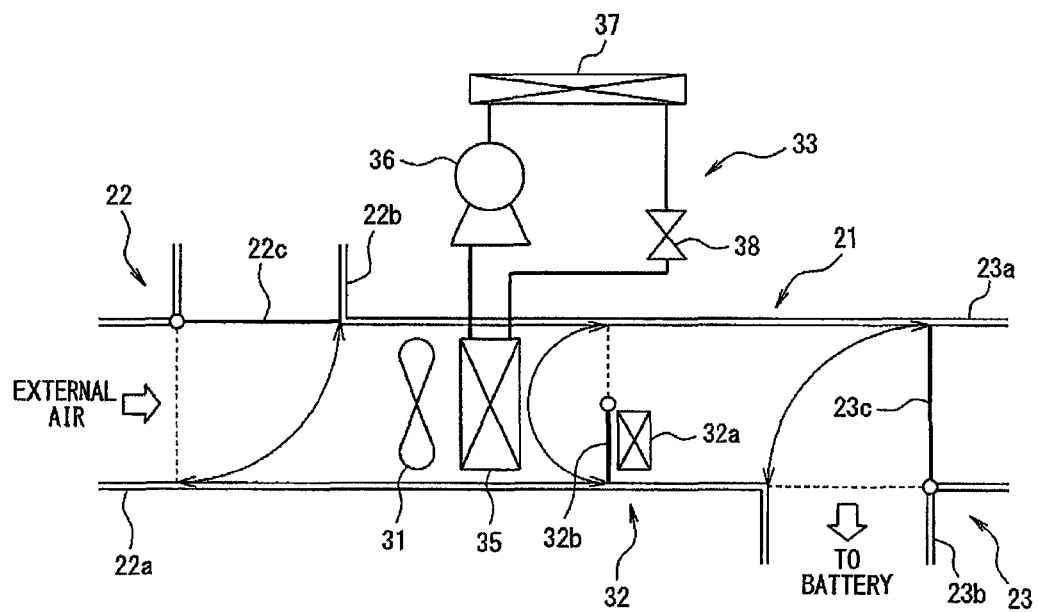
FIG. 7 is a conceptual diagram illustrative of a flow passage in a cooling mode.

Additionally, when the battery temperature $T_{BAT}$ is equal to or higher than the cooling needed temperature threshold $T_H$ and the cooling of the battery pack 12 with the air-conditioning equipment 13 is determined to be needed at step S11, the flow passage of the duct 21 is switched as illustrated in FIG. 7. The control signals are sent from the above various controllers to perform the cooling mode for quickly charging the battery pack 12, while introducing (blowing) cool wind into the accommodating space S (step S300).

In this cooling mode, after the flow passage of the blown wind is switched by the dampers 22c and 23c, the blowing fan 31 or the air-conditioning equipment 13 is driven to perform a cooling process of the battery pack 12. To be more precise, firstly, the external-internal damper 22c of the external-internal duct 22 closes the internal air communicating unit 22b to form a flow passage that opens to be capable of taking in the external air from the external air communicating unit 22a, and in addition, the internal-internal damper 23c of the internal-internal duct 23 closes the vehicle interior communicating unit 23a to form a flow passage that opens to be capable of taking the air-conditioned wind by the air-conditioning equipment 13 into the accommodating space S of the battery pack 12 from the battery communicating unit 23b. Furthermore, in the heating unit 32, the switching damper 32b is disposed on the upstream side of the heater core 32a (to shield the flow passage at the time of warming) to form a flow passage that is not affected by remaining heat or the like. The blowing fan 31 is rotary-driven with the blowing damper switched, the external air is introduced from the external-internal duct 22 (the external air communicating unit 22a) of the duct 21 to be blown into the accommodating space S of the battery pack 12 from the internal-internal duct 23 (the battery communicating unit 23b). At the same time, the air-conditioning equipment 13 causes the blowing wind in the duct 21 to be in touch with the surface of the evaporator 35, which is cooled down by driving the cooling compressor 36 of the cooling unit 33 to utilize the condenser 37 and the expansion valve 38, and then such cool wind (air-conditioned wind) is blown into the accommodating space S to cool down the battery pack 12.

Figure 8:
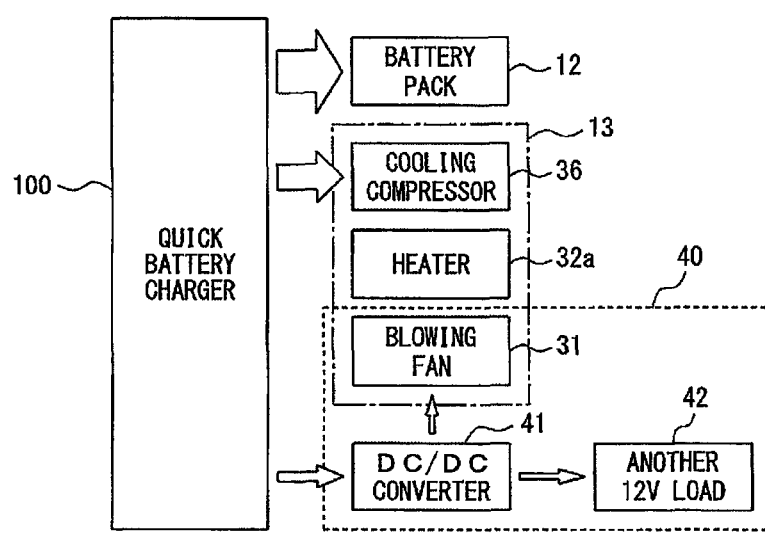
FIG. 8 is a block diagram illustrative of power supply distributions in the cooling mode.

Thus, when the battery pack 12 has a high temperature and falls within a quickly unchangeable temperature range ($T_H \le T_{BAT}$) the power is supplied to the cooling compressor 36, the blowing fan 31, and the electric part (load) 42 of the air-conditioning equipment 13, while securing the power necessary for the quick charge of the battery pack 12, as illustrated in FIG. 8. Accordingly, the quick charging control is enabled to effectively utilize the supply capability of the battery charger 100 sufficiently. It is possible to store a sufficient amount of electric energy in the battery pack 12 quickly.

(Mode Determination)

Moreover, at steps S11 and S12, when it is determined that the battery temperature $T_{BAT}$ is lower than the warming needed temperature threshold $T_C$ (<cooling needed temperature threshold $T_H$) and warming is needed, whether or not stopping of air conditioning (stopping of heating) is instructed (flag $F_{stp}$=1) in the foregoing process (step S13). When the flag $F_{stp}$=1 set by the stopping of air conditioning at the time of performing the foregoing heating mode is confirmed, the processing goes to step S200 to perform the non-blowing mode directly, since the battery pack 12 has already been warmed to a quickly chargeable state in an efficient manner without a temperature adjustment. Then, the same processing is repeated. Herein, in the present embodiment, as will be described later, when the battery temperature $T_{BAT}$ is lower than the warming needed temperature threshold $T_C$, the quick charge is initiated while warming the battery pack 12 with the warmed wind by the air-conditioning equipment 13. After the quick charge with a sufficient power capacity is secured, the temperature of the battery pack 12 tends to increase and the air conditioning is stopped (flag $F_{stp}=1$). However, when it is assumed that the warming of the battery pack 12 is needed again in an extremely cold region, and when it is determined that warming is needed again since the battery temperature $T_{BAT}$ becomes lower than the warming needed temperature threshold $T_C$ even after a certain period of time elapses, whether or not there is a need for the heating mode or the dehumidification heating mode may be determined to perform it.

On the other hand, at step S13, when it is confirmed that the flag $F_{stp}$ is not 1 (i.e., flag $F_{stp}=0$) and the stopping of air conditioning is not instructed, the temperature of the battery pack 12 is not adjusted (the battery pack 12 does not fall within a temperature range of quickly chargeable in an efficient manner) and the battery pack 12 is in a warming needed state. It is confirmed whether or not the battery pack 12 can be warmed comfortably without generating dew condensation even if the warm wind heated by the air-conditioning equipment 13 is blown into the accommodating space S (step S14).

Figure 9:
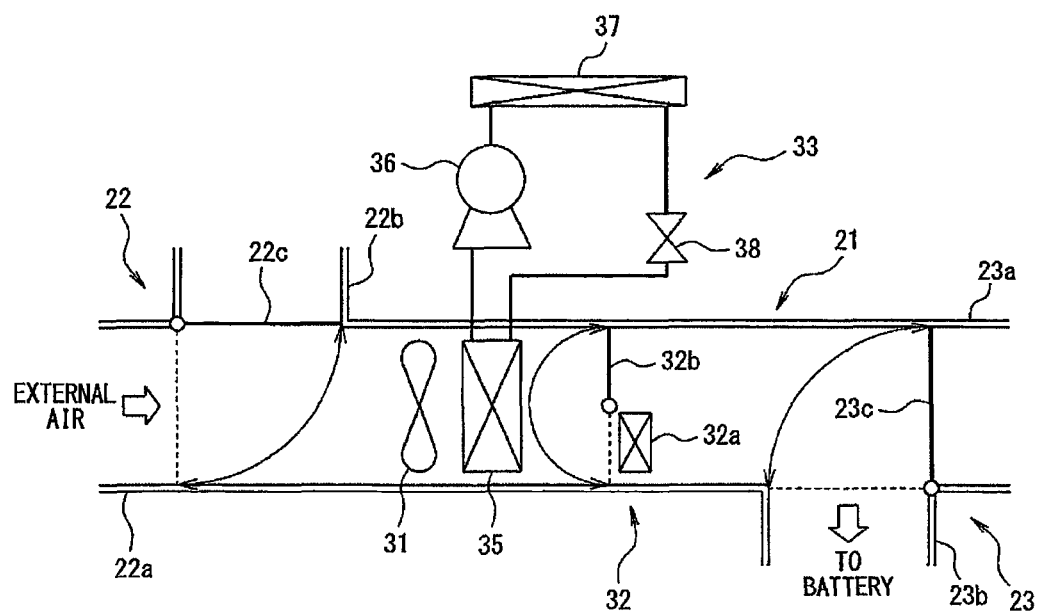
FIG. 9 is a conceptual diagram illustrative of a flow passage in heating and dehumidification heating modes.

In detail, before the blowing destination of the air-conditioned wind in the duct 21 is switched to the accommodating space S of the battery pack 12, the various sensors 16a to 16c detect the temperature and humidity of the warm wind in the duct 21 or the temperature of the battery pack 12 to acquire the sensor information. Subsequently, whether or not the dew condensation occurs is determined by whether or not the battery temperature $T_{BAT}$ of the battery pack 12 is equal to or higher than the dewing temperature $T_{DEW}$ calculated from the dew condensation map (FIG. 4) based upon the temperature of wind $T_W$ and the humidity of wind $H_W$ of the warm wind to be blown into the accommodating space S. When the battery temperature $T_{BAT}$ of the battery pack 12 is equal to or higher than the dewing temperature $T_{DEW}$, it is determined that the dew condensation does not occur on the surface of the battery pack 12. Referring to FIG. 9, the flow passage of the duct 21 is switched and the simple heating mode is performed such that control signals are sent from the above various controllers to introduce (blow) the warm wind into the accommodating space S and quickly charge the battery pack 12 (step S400). In contrast, when the battery temperature $T_{BAT}$ of the battery pack 12 is lower than the dewing temperature $T_{DEW}$, it is determined that the dew condensation occurs on the surface of the battery pack 12. The dehumidification heating mode is performed such that the flow passage of the duct 21 is switched to the same flow passage with that of the heating mode and control signals are sent from the above various controllers to introduce (blow) the dehumidified warm wind into the accommodating space S and quickly charge the battery pack 12 (step S500).

(Heating Mode)

Figure 10:
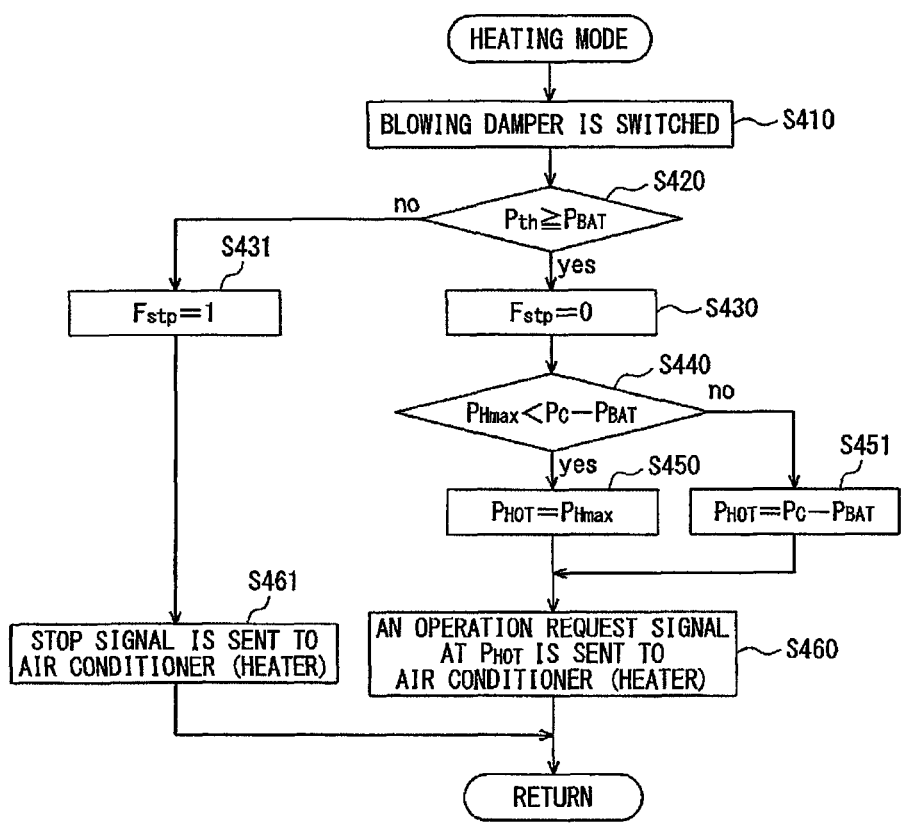
FIG. 10 is a flowchart illustrative of subroutine control in the heating mode.

Firstly, in the heating mode the blowing damper is switched as illustrated in FIG. 10 (step S410). In this switching of the blowing damper, same as in the cooling mode, the flow passage is formed to take in the external air from the external air communicating unit 22a by the external-internal damper 22c of the external-internal duct 22, and in addition, the flow passage is also formed to blow the air-conditioned wind by the air-conditioning equipment 13 into the accommodating space S from the battery communicating unit 23b by the internal-internal damper 23c of the internal-internal duct 23. Furthermore, the heating unit 32 causes the switching damper 32b to be positioned to close the flow passage (the upstream side of the heater core 32a) of bypassing the heater core 32a (open only the flow passage for warming), so as to form the flow passage for heating the air-conditioned wind to be blown into the accommodating space S of the battery pack 12.

Next, a maximum chargeable power $P_{BAT}$ of the battery pack 12 for receiving the power from the battery charger 100 is compared with a preset heating stop power threshold $P_{th}$ for determining the warming is unnecessary (step S420). When the maximum chargeable power $P_{BAT}$ exceeds the heating stop power threshold $P_{th}$ and the battery pack 12 has already been in a quickly chargeable state without a temperature adjustment, "1" is set to flag $F_{stp}$ (step S431). An air conditioning stop (heating stop) signal is sent to the air-conditioning equipment 13 from the heater controller (step S461). In this situation, in the present embodiment, a description will be given of a case where the maximum chargeable power $P_{BAT}$ is received from the battery charger 100 for charging the battery pack 12. However, it goes without saying that the controller 15 may detect the maximum chargeable power $P_{BAT}$.

On the other hand, at step S420, when it is confirmed that the maximum chargeable power $P_{BAT}$ is equal to or smaller than the heating stop power threshold $P_{th}$ and does not reach the quickly chargeable state, since the battery pack 12 is not warmed sufficiently, the surplus power obtained by subtracting the maximum chargeable power $P_{BAT}$ for charging the battery pack 12 from the power $P_C$ chargeable from the battery charger 100 is compared with a maximum power $P_{Hmax}$ conductive to the heater core 32a of the heating unit 32 (step S440). When the surplus power obtained by subtracting the maximum chargeable power $P_{BAT}$ of the battery pack 12 from the power $P_C$ chargeable from the battery charger 100 is greater than the maximum power $P_{Hmax}$ (the power can be supplied sufficiently), a heater maximum power $P_{Hmax}$ is set as a heater driving power $P_{HOT}$ to be supplied to the heater core 32a (step S450). On the other hand, the surplus power obtained by subtracting the maximum chargeable power $P_{BAT}$ for charging the battery pack 12 from the power $P_C$ chargeable from the battery charger 100 is smaller than the heater maximum power $P_{Hmax}$ of the heater core 32a, a power value (surplus power) obtained by subtracting the maximum chargeable power $P_{BAT}$ of the battery pack 12 from the power $P_C$ that can be supplied from the battery charger 100 is set as the heater driving power $P_{HOT}$ of the heater core 32a (step S451). After this, the heater controller sends an operation request signal at the heater driving power $P_{HOT}$ to the air-conditioning equipment 13 (step S460). The blowing fan 31 rotary drives and the heater core 32a of the heating unit 32 heats the external air to be taken from the external-internal duct 22 (the external air communicating unit 22a) of the duct 21. While the wind is being warmed (air-conditioned wind), the wind is blown from the internal-internal duct 23 (the battery communicating unit 23b) into the accommodating space S of the battery pack 12 to warm the battery pack 12 in the accommodating space S.

Figure 11:
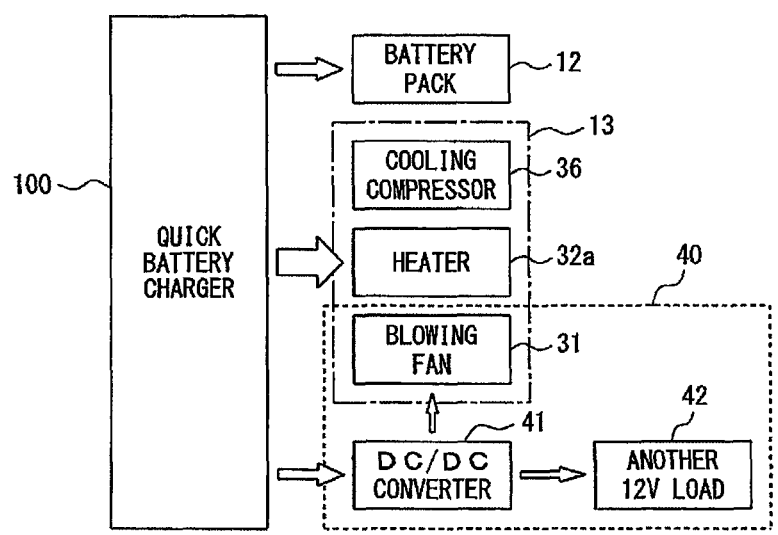
FIG. 11 is a block diagram illustrative of power supply distributions in the heating mode.

Thus, when the battery pack 12 is in a low-temperature state and falls within a temperature range where the battery pack 12 cannot be quickly charged efficiently ($T_{BAT}<T_C$), as illustrated in FIG. 11, the power is supplied to the heater core 32a of the air-conditioning equipment 13, the blowing fan 31, and the electric parts (loads) 42, while securing the power needed for quick charge of the battery pack 12. Accordingly, the quick charging control is enabled to effectively utilize the supply capability of the battery charger 100 sufficiently. It is possible to store a sufficient amount of electric energy in the battery pack 12 quickly.

(Dehumidification Heating Mode)

Figure 12:
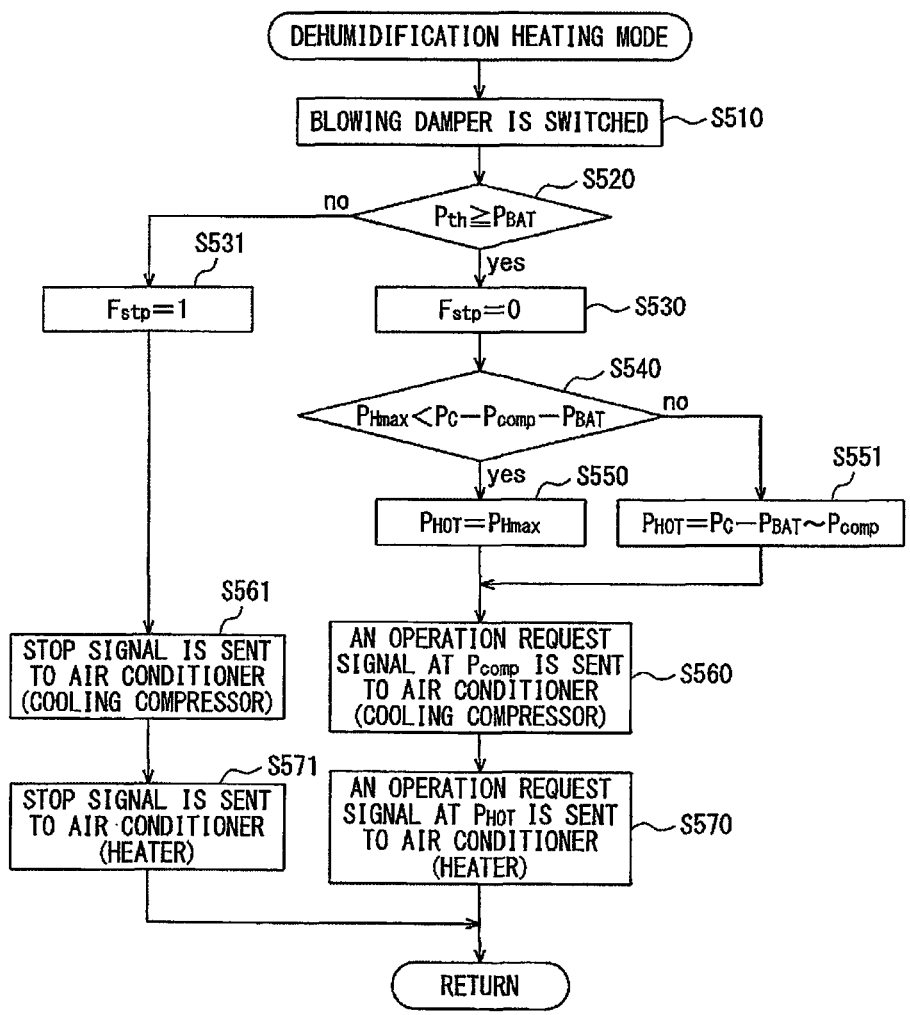
FIG. 12 is a flowchart illustrative of subroutine control in the dehumidification heating mode.

In addition, in the dehumidification heating mode, the blowing damper is switched in the same manner with the heating mode, as illustrated in the flowchart of FIG. 12 (step S510). In this switching of the blowing damper, as in the heating mode, the flow passage is formed to take in the external air from the external air communicating unit 22a of the external-internal duct 22, and in addition, the flow passage is also formed to blow the air-conditioned wind by the air-conditioning equipment 13 into the accommodating space S from the battery communicating unit 23b of the internal-internal duct 23. Furthermore, the heating unit 32 causes the switching damper 32b to close the flow passage of bypassing the heater core 32a so as to form the flow passage for heating the air-conditioned wind to be blown into the accommodating space S of the battery pack 12.

Then, the maximum chargeable power $P_{BAT}$ of the battery pack 12 is compared with the heating stop power threshold $P_{th}$ (step S520). When the maximum chargeable power $P_{BAT}$ exceeds the heating stop power threshold $P_{th}$ (the battery pack 12 has already been in a quickly chargeable state), "1" is set to flag $F_{stp}$ (step S531). Air conditioning stop signal is sent to the air-conditioning equipment 13 from a cooling compressor controller and a heater controller (step S561, step S571).

On the other hand, at step S520, when it is confirmed that the warming of the battery pack 12 is insufficient and is not in the quickly chargeable state where the maximum chargeable power $P_{BAT}$ is equal to or smaller than the heating stop power threshold $P_{th}$, the surplus power obtained by subtracting, from the power $P_C$ chargeable from the battery charger 100, the maximum chargeable power $P_{BAT}$ for charging the battery pack 12 and a driving power $P_{comp}$ needed for driving the cooling compressor 36 of the air-conditioning equipment 13 having a dehumidifying function is compared with the maximum power $P_{Hmax}$ of the heater core 32a of the heating unit 32 (step S540). When the surplus power obtained by subtracting, from the power $P_C$ chargeable from the battery charger 100, the maximum chargeable power $P_{BAT}$ for charging the battery pack 12 and the driving power $P_{comp}$ for driving the cooling compressor 36 is greater than the maximum power $P_{Hmax}$ of the heater core 32a (the power can be supplied sufficiently), the maximum power $P_{Hmax}$ is set as the heater driving power $P_{HOT}$ to be supplied to the heater core 32a (step S550). In contrast, when the surplus power obtained by subtracting, from the power $P_C$ chargeable from the battery charger 100, the maximum chargeable power $P_{BAT}$ for charging the battery pack 12 and the driving power $P_{comp}$ for driving the cooling compressor 36 is smaller than the maximum power $P_{Hmax}$ of the heater core 32a, the power value (surplus power) obtained by subtracting, from the power $P_C$ chargeable from the battery charger 100, the maximum chargeable power $P_{BAT}$ of the battery pack 12 and the driving power $P_{comp}$ for driving the cooling compressor 36 is set as the heater driving power $P_{HOT}$ of the heater core 32a (step S551). After this, an operation request signal for the driving power $P_{comp}$ or the heater driving power $P_{HOT}$ is sent to the air-conditioning equipment 13 from the heater controller or the compressor controller (step S560, step S570). The blowing fan 31 rotary drives to cause the external air to be taken from the external-internal duct 22 (the external air communicating unit 22a) of the duct 21 to be in touch with the evaporator 35 of the air-conditioning equipment 13 for dehumidification and heat the air at the heater core 32a of the heating unit 32 to become warm wind (air-conditioned wind), so that the wind is blown into the accommodating space S of the battery pack 12 from the internal-internal duct 23 (the battery communicating unit 23b) to warm the battery pack 12 in the accommodating space S.

Figure 13:
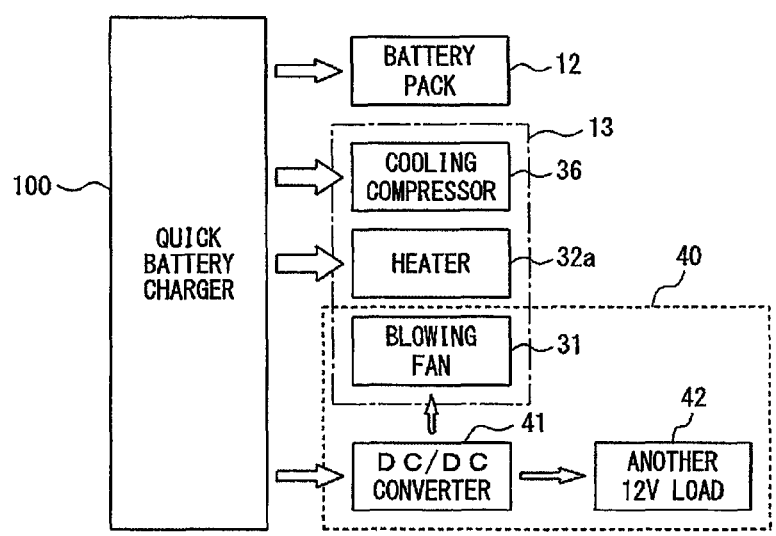
FIG. 13 is a block diagram illustrative of power supply distributions in the dehumidification heating mode.

Thus, even when the battery pack 12 is in a low-temperature state and falls within a temperature range where the battery pack 12 cannot be quickly charged efficiently ($T_{BAT} < T_C$) and the battery pack 12 is in a temperature-humidity environment where dew condensation will occur if the warm wind is blown directly, as illustrated in FIG. 13, the power is supplied to the heater core 32a of the air-conditioning equipment 13, the cooling compressor 36, the blowing fan 31, and the electric parts (loads) 42, while securing the power needed for quick charge of the battery pack 12. Accordingly, the quick charging control is enabled to effectively utilize the supply capability of the battery charger 100 sufficiently. It is possible to store a sufficient amount of electric energy in the battery pack 12 quickly.

As described heretofore, in the present embodiment, when the battery pack 12 is warmed for quick charge, even if the surface temperature of the battery pack 12 has the temperature-humidity condition where the warm wind to be blown from the duct 21 into the accommodating space S generates dew condensation, the warm wind in the duct 21 is dehumidified so that the battery pack 12 can be quickly charged without dew condensation. Accordingly, it is possible to quickly charge the battery pack 12 comfortably in an efficient manner.

Herein, according to one aspect of the present embodiment, the air-conditioning equipment 13 mounted in a vehicle that is used for adjusting the battery temperature has been described. However, the present invention is not limited to this. A heater having a dehumidifying function may be provided for charging only.

The scope of the present invention is not limited to the embodiments illustrated in the drawings, and includes all embodiments that can bring equivalent effects about which the present invention is indented to bring. Moreover, the scope of the present invention is not limited to a combination of the inventions recited in the respective claims, and may include any desired combination of specific features that are herein described.

INDUSTRIAL AVAILABILITY

Heretofore, embodiments of the present invention have been described. However, the present invention is not limited to the above ones, and it should be apparent that modifications and adaptations to those embodiments may occur without departing from the scope of the technical concept.

REFERENCE SIGNS LIST

10 electric vehicle
10a vehicle interior
12 battery pack
13 air-conditioning equipment
15 controller
15a dew condensation determining unit
16a blowing wind temperature sensor
16b battery temperature sensor
16c humidity sensor
17 connecting unit
21 duct
22a external air communicating unit
22b internal air communicating unit
22c external-internal damper
23a vehicle interior communicating unit 23b battery communicating unit
23c internal-internal damper
31 blowing fan
32 heating unit
32a heater core
32b switching damper
33 cooling unit
35 evaporator
36 cooling compressor
37 condenser
38 expansion valve
100 battery charger
S accommodating space

The invention claimed is:

1. A battery temperature adjusting system comprising:
a battery temperature detector configured to detect a temperature of a battery mounted in a vehicle which is repeatedly chargeable;
a warm wind blowing unit configured to direct warm wind toward the battery;
a temperature adjusting controller configured to warm the battery by causing the warm wind blowing unit to blow the warm wind toward the battery to provide a flow of the warm wind around the battery in accordance with the temperature of the battery detected by the battery temperature detector;
a dew condensation determining unit configured to determine whether or not dew condensation may occur on the battery if the warm wind is directed toward the battery; and
a dehumidifying unit configured to dehumidify the warm wind directed by the warm wind blowing unit toward the battery,
wherein the temperature adjusting controller causes the dehumidifying unit to dehumidify the warm wind directed by the warm wind blowing unit toward the battery upon the dew condensation determining unit determining that dew condensation may occur on the battery if the warm wind is directed toward the battery when charging the battery with an external battery charger outside the vehicle.

2. The battery temperature adjusting system according to claim 1,
wherein the warm wind blowing unit comprises a flow passage switching unit configured to direct a flow passage of an air-conditioning equipment provided in the vehicle toward the battery and prevent the flow passage from communicating with an interior of the vehicle, and
wherein the dehumidifying unit is composed of a dehumidifying system included in the air-conditioning equipment.

3. A battery charging system for repeatedly charging a battery mounted in a vehicle and repeatedly chargeable from an external battery charger, the battery charging system comprising:
the battery temperature adjusting system according to claim 2; and
a power controller for controlling supply of power from the external battery charger to an electric compressor included in the air-conditioning equipment to activate the electric compressor when the dehumidifying unit dehumidifies the warm wind which the warm wind blowing unit blows when charging the battery with the external battery charger.

4. The battery charging system according to claim 3, wherein the power controller determines power usable for supply of warm wind after subtracting power for charging of the battery and power required to activate the electric compressor from power chargeable from the external battery charger and uses the determined power for the supply of warm wind.

5. The battery temperature adjusting system according to claim 1, wherein a flow path extends from the warm wind blowing unit to the battery without passing through an interior of the vehicle.

6. The battery temperature adjusting system according to claim 1, wherein a first flow path extends from the warm wind blowing unit to the interior of the vehicle, and wherein a second flow path extends from the warm wind blowing unit to the battery without passing through an interior of the vehicle; and
wherein the system further includes a switching unit for switching wind blowing from the warm wind blowing unit to blow through either the first flow path or the second flow path, or to adjust an amount of wind blowing from the warm wind blowing unit blowing through the first flow path and the second flow path.

7. The battery temperature adjusting system according to claim 6, wherein the temperature adjusting controller is configured to cause the switching unit to close the first path so that wind blowing from the warm wind blowing unit passes through the second flow path to the battery during charging by the external battery charger, and the flow of warm wind is provided in accordance with the temperature of the battery detected by the battery temperature detector.

8. The battery temperature adjusting system according to claim 1, further including a power controller configured to supply power from the external battery charger to the temperature adjusting system such that during charging of the battery with the external battery charger, power for adjusting temperature of the battery is provided by the external battery charger.

9. The battery temperature adjusting system according to claim 8, wherein the power controller is configured such that when the temperature of the battery detected by the battery temperature detector is in a predetermined range, power is not supplied to adjust temperature.

10. The battery charging system according to claim 3, wherein the power controller is configured such that when the temperature of the battery detected by the battery temperature detector is in a predetermined range, power is not supplied to adjust temperature.

11. The battery temperature adjusting unit according to claim 1, wherein:
(a) the temperature adjusting controller is configured such that when it is determined that the temperature of the battery as detected by the battery temperature detector is such that heating is needed and the temperature of the battery is above a dewing temperature as determined by the dew condensation determining unit, the temperature adjusting controller causes warm wind of the warm wind blowing unit to be blown to the battery without dehumidifying by the dehumidifying unit; and
(b) the temperature adjusting controller is further configured such that when it is determined that the temperature of the battery as detected by the battery temperature detector is such that heating is need and the temperature is below a dewing temperature as determined by the dew condensation determining unit, the temperature adjusting controller causes warm wind of the warm wind blowing unit to be blown to the battery and the warm wind is dehumidified by the dehumidifying unit.

12. The battery charging system of claim 3, wherein:
(a) the temperature adjusting controller is configured such that when it is determined that the temperature of the battery as detected by the battery temperature detector is such that heating is needed and the temperature of the battery is above a dewing temperature as determined by the dew condensation determining unit, the temperature adjusting controller causes warm wind of the warm wind blowing unit to be blown to the battery without dehumidifying by the dehumidifying unit; and
(b) the temperature adjusting controller is further configured such that when it is determined that the temperature of the battery as detected by the battery temperature detector is such that heating is need and the temperature is below a dewing temperature as determined by the dew condensation determining unit, the temperature adjusting controller causes warm wind of the warm wind blowing unit to be blown to the battery and the warm wind is dehumidified by the dehumidifying unit.

13. The battery temperature adjusting system according to claim 1, wherein the temperature adjusting controller is configured to begin a temperature control operation in response to a detection that the battery has been connected to the battery charger.

14. The battery charging system according to claim 3, wherein the temperature adjusting controller is configured to begin a temperature control operation in response to a detection that the battery has been connected to the battery charger.

* * * * *